US012673646B2

(12) United States Patent
Michels et al.

(10) Patent No.: US 12,673,646 B2
(45) Date of Patent: Jul. 7, 2026

(54) PNEUMATIC BRAKE PEDAL MODULE

(71) Applicant: ZF Active Safety GmbH, Koblenz (DE)

(72) Inventors: Erwin Michels, Kail (DE); Peter Polke, Hanroth (DE)

(73) Assignee: ZF Active Safety GmbH, Koblenz (DE)

( * ) Notice: Subject to any disclaimer, the term of this patent is extended or adjusted under 35 U.S.C. 154(b) by 688 days.

(21) Appl. No.: 17/868,389

(22) Filed: Jul. 19, 2022

(65) Prior Publication Data

US 2023/0033814 A1     Feb. 2, 2023

(30) Foreign Application Priority Data

Jul. 27, 2021    (DE) .......................... 102021119439.3

(51) Int. Cl.
*B60T 8/40*          (2006.01)
*B60T 7/04*          (2006.01)

(52) U.S. Cl.
CPC .............. *B60T 8/409* (2013.01); *B60T 7/042* (2013.01)

(58) Field of Classification Search
None
See application file for complete search history.

(56) References Cited

U.S. PATENT DOCUMENTS 4,796,871 A * 1/1989 Bauer ....................... F16F 9/49
                                                     188/282.1
4,909,488 A * 3/1990 Seibert ................. F16F 9/0218
                                                     267/64.11

(Continued)

FOREIGN PATENT DOCUMENTS

DE          2513302 A1 *   5/1985
DE          19755481 A1    6/1999
               (Continued)

OTHER PUBLICATIONS

DE2513302C2—English Machine Translation (Year: 1985).*
WO-2009154183-A1—English Machine Translation (Year: 2009).*
DE-102005023942-A1—English Machine Translation (Year: 2006).*

*Primary Examiner* — Melanie Torres Williams
(74) *Attorney, Agent, or Firm* — Kristin L. Murphy

(57)                ABSTRACT

A pneumatic brake pedal module for a brake-by-wire brake system of a vehicle is disclosed. The brake pedal module includes a pivotably mounted brake pedal and a damping unit. The damping unit is mechanically coupled to the brake pedal to generate a resistance when the brake pedal is actuated. The damping unit comprises a housing and a piston, which is mounted movably in the housing and divides an internal space of the housing into a pressure chamber and a vacuum chamber. The pressure chamber and the vacuum chamber are connected to one another in terms of flow. The piston has on its running surface an encircling annular space in which a ring seal is accommodated in an axially movable manner. The ring seal is located at least in a flow path between the pressure chamber and the vacuum chamber and forms a restrictor in the at least one flow path, which restrictor frees different flow cross sections in the at least one flow path depending on the axial direction of movement, and damps the movement of the piston with differing degrees of strength depending on a direction of movement of the piston.

17 Claims, 5 Drawing Sheets

(56) References Cited

U.S. PATENT DOCUMENTS

| | | | | |
|---|---|---|---|---|
| 7,614,616 B2 * | 11/2009 | Bauman | ................ | F16F 9/0245 |
| | | | | 267/284 |
| 10,571,949 B2 | 2/2020 | Isono | | |
| 2006/0290037 A1 * | 12/2006 | Born | ........................ | F16F 9/48 |
| | | | | 267/120 |
| 2018/0093648 A1 | 4/2018 | Pennala et al. | | |

FOREIGN PATENT DOCUMENTS

| | | | | | |
|---|---|---|---|---|---|
| DE | 29921027 U1 | 6/2001 | | | |
| DE | 102005023942 A1 * | 11/2006 | ........... | F16F 9/0218 | |
| DE | 102006030846 A1 | 1/2008 | | | |
| DE | 102007023303 A1 | 11/2008 | | | |
| DE | 102020211084 A1 | 3/2022 | | | |
| EP | 0904221 B1 | 9/2001 | | | |
| EP | 1233891 B1 | 3/2004 | | | |
| EP | 3380374 B1 | 8/2020 | | | |
| GB | 2184523 A * | 6/1987 | ............. | B60T 7/047 | |
| WO | WO-03014590 A2 * | 2/2003 | ........... | F16F 9/0254 | |
| WO | WO-2009154183 A1 * | 12/2009 | ........... | F16F 9/3415 | |
| WO | 2015165450 A1 | 11/2015 | | | |

* cited by examiner

PNEUMATIC BRAKE PEDAL MODULE

CROSS-REFERENCE TO RELATED APPLICATION

This application claims priority to German Patent Application No. 102021119439.3, filed Jul. 27, 2021, the disclosure of which is incorporated herein by reference in its entirety.

TECHNICAL FIELD

The disclosure relates to a pneumatic brake pedal module for a "brake-by-wire" brake system of a vehicle.

BACKGROUND

In the case of "brake-by-wire" brake systems, a braking intention of a driver is detected electronically, and the brakes of the vehicle are actuated by one or more purely electric actuators. For this purpose, provision can be made for each of the brakes of the individual wheels to be assigned an electric-motor actuator, as known, for example, in the case of an "EMB" (electric-motor brake). However, provision can also be made for an electrohydraulic actuator to be activated centrally in order to actuate the brakes hydraulically in a conventional manner, as known, for example, in an "IBS" (integrated brake system). Furthermore, a "brake-by-wire" brake system can be embodied as a hybrid system in that the brakes of one vehicle axle, for example those of the front wheels, are assigned to an "IBS" and the brakes of another vehicle axle, for example those of the rear wheels, are each embodied as an "EMB".

Since in "brake-by-wire" brake systems there is generally no mechanical connection between a brake pedal and the brakes, a reaction behaviour of the brake pedal is simulated, e.g. hydraulically or pneumatically. More precisely, a greater resistance acts with increasing travel when the brake pedal is actuated.

In order to impose a hysteresis on a movement of the brake pedal, there is usually a restrictor, which is connected to the brake pedal module by fluid lines and regulates a fluid pressure in a working space.

Although such systems give the driver a good simulation of a reaction behaviour of the brake pedal, they are complicated in terms of integration into a vehicle environment.

SUMMARY

What is needed is a brake pedal module which can be integrated particularly easily into a vehicle installation space and at the same time can simulate a reaction behaviour of the brake pedal in the best possible manner.

According to the disclosure, a pneumatic brake pedal module for a "brake-by-wire" brake system of a vehicle is provided. The brake pedal module has a pivotably mounted brake pedal and a damping unit, which is mechanically coupled to the brake pedal in order to generate a resistance when the brake pedal is actuated. The damping unit comprises a housing and a piston, which is mounted movably in the housing and divides an internal space of the housing into a pressure chamber and a vacuum chamber. The pressure chamber and the vacuum chamber are connected to one another in terms of flow and the piston has on its running surface an encircling annular space in which a ring seal is accommodated in an axially movable manner. The ring seal is located at least in a flow path between the pressure chamber and the vacuum chamber and forms a restrictor in the at least one flow path, which restrictor frees different flow cross sections in the at least one flow path depending on the axial direction of movement, and damps the movement of the piston with differing degrees of strength depending on a direction of movement of the piston.

According to the disclosure, the restrictor for adjusting damping is not arranged outside a housing of the damping unit but is integrated into the damping unit, into the piston. In this way, the brake pedal module, for example the damping unit, is particularly compact and can be positioned in a flexible manner in an installation space environment. Another advantage is that no fluid lines have to be connected to the damping unit, and this likewise contributes to the fact that the brake pedal module can be positioned in a particularly flexible manner.

The restrictor allows, a controlled fluid flow between the pressure chamber and the vacuum chamber. The larger the flow cross section freed by the restrictor, the less the damping, since a lower flow resistance prevails with increasing flow cross section. Consequently, the strength of damping can be adjusted by adjusting the flow cross section by the restrictor.

A further advantage of the brake pedal module according to the disclosure is that the strength of the damping is automatically adjusted to a suitable value depending on a direction of movement of the piston, the flow cross section changing when the direction of the piston changes. Thus, no control unit is necessary to regulate the flow cross section.

In particular, the flow cross section can assume two different values.

As a result, a hysteresis can automatically be imposed on the movement of the brake pedal.

The annular space and the ring seal are designed in such a way that, depending on the direction of movement, the ring seal rests selectively on one of two opposite axial boundary surfaces of the annular space and changes a flow cross section of the at least one flow path. Since the ring seal comes to rest against an axial boundary surface, the ring seal is positioned in a defined position in the annular space and changes the flow cross section depending on the direction of movement of the piston. In this way, the flow cross section likewise assumes a defined value, thereby also setting the strength of the damping to a defined value and consequently achieving a desired reaction behaviour of the brake pedal.

According to one exemplary arrangement, depending on which boundary surface it bears against, the ring seal seals a flow path from the annular space along the running surface past the piston either into the vacuum chamber or into the pressure chamber. In particular, the flow path does not have to be completely leaktight, but the flow has to be reduced as compared with a position on the other boundary surface. In other words, a fluid flow out of the annular space along the running surface of the piston in one direction of flow is blocked or reduced and released in an opposite direction of flow. This prevents a fluid flow along the running surface of the piston from adversely affecting damping.

Starting from the annular space, near the boundary surface which is closer to the pressure chamber, at least one first opening in the piston leads to the pressure chamber and, starting from the annular space, near the boundary surface which is further away from the pressure chamber, at least one second opening in the piston leads to the vacuum chamber. In particular, the ring seal is designed in such a way that, when the direction of the piston changes, the ring seal is moved automatically in the annular space to the at least one first opening or at least one second opening and changes an effective flow cross section of the openings. As a result, a volumetric flow can be regulated in a particularly simple manner and particularly efficient restriction can take place. Expensive restrictors can be dispensed with.

For example, the at least one first and/or at least one second opening is partially covered in the associated position of the ring seal. In this way, an effective flow cross section of the openings is changed in a particularly simple manner.

The position of the openings can be matched to the displaced positions of the ring seal in the annular space in such a way that, when the brake pedal is actuated, the ring seal reduces a flow path from the pressure chamber to the vacuum chamber and, upon return to the initial position, frees a flow path from the vacuum chamber to the pressure chamber, in particular to the maximum extent. This contributes to the strength of the damping being adjusted to a desired value depending on the direction of movement of the piston.

The at least one first opening has, in particular, a larger flow cross section than the at least one second opening.

Alternatively, the at least one first opening and the at least one second opening can have the same flow cross section, wherein the number of first openings is greater than the number of second openings.

This means that an overall flow cross section starting from the annular space into the vacuum chamber is smaller than an overall flow cross section starting from the annular space into the pressure chamber.

In this way, the advantage is achieved that fluid can flow only slowly out of the pressure chamber into the vacuum chamber via the at least one second opening when the brake pedal is actuated and a movement of the piston results therefrom, as a result of which strong damping is achieved when the brake pedal is actuated. When the brake pedal is released, fluid can flow more quickly out of the vacuum chamber into the pressure chamber via the at least one first opening, thereby achieving rapid resetting of the brake pedal.

The damping unit comprises a return spring, which is arranged in the pressure chamber. The return spring pushes the piston into an unactuated initial position. The piston is in the unactuated initial position when the brake pedal is not actuated. The return spring produces a resistance which contributes to producing the reaction behaviour of the brake pedal. However, the return spring serves primarily to move the brake pedal back into its unactuated position.

In one exemplary arrangement, the return spring is of progressive design. A spring of this kind has a non-linear characteristic curve. To be more precise, a progressive spring is relatively soft when subjected to little force and becomes harder when subjected to increasing load.

The damping unit is pneumatically self-contained. Specifically, the housing is pneumatically self-contained. A particular advantage here is that there are no fluid connections on the damping unit or no fluid lines need to be connected to the damping unit. Thus, the brake pedal module can be manufactured as a separate unit and positioned in an installation space environment independently of other components or fluid lines. Moreover, the damping unit can be particularly compact as a result.

The damping unit can be mechanically coupled to the brake pedal in such a way that the damping unit is subjected to tension or compression when the brake pedal is actuated. In this way, particularly flexible positioning of the damping unit relative to the brake pedal is possible.

The brake pedal module according to the disclosure is suitable for use in a "brake-by-wire" brake system, which is may be equipped with "EMB" brakes and/or is designed as an "IBS" system.

BRIEF DESCRIPTION OF DRAWINGS

Further advantages and features of the disclosure will become apparent from the following description and from the accompanying drawings, to which reference is made. In the drawings.

DETAILED DESCRIPTION

Figure 1:
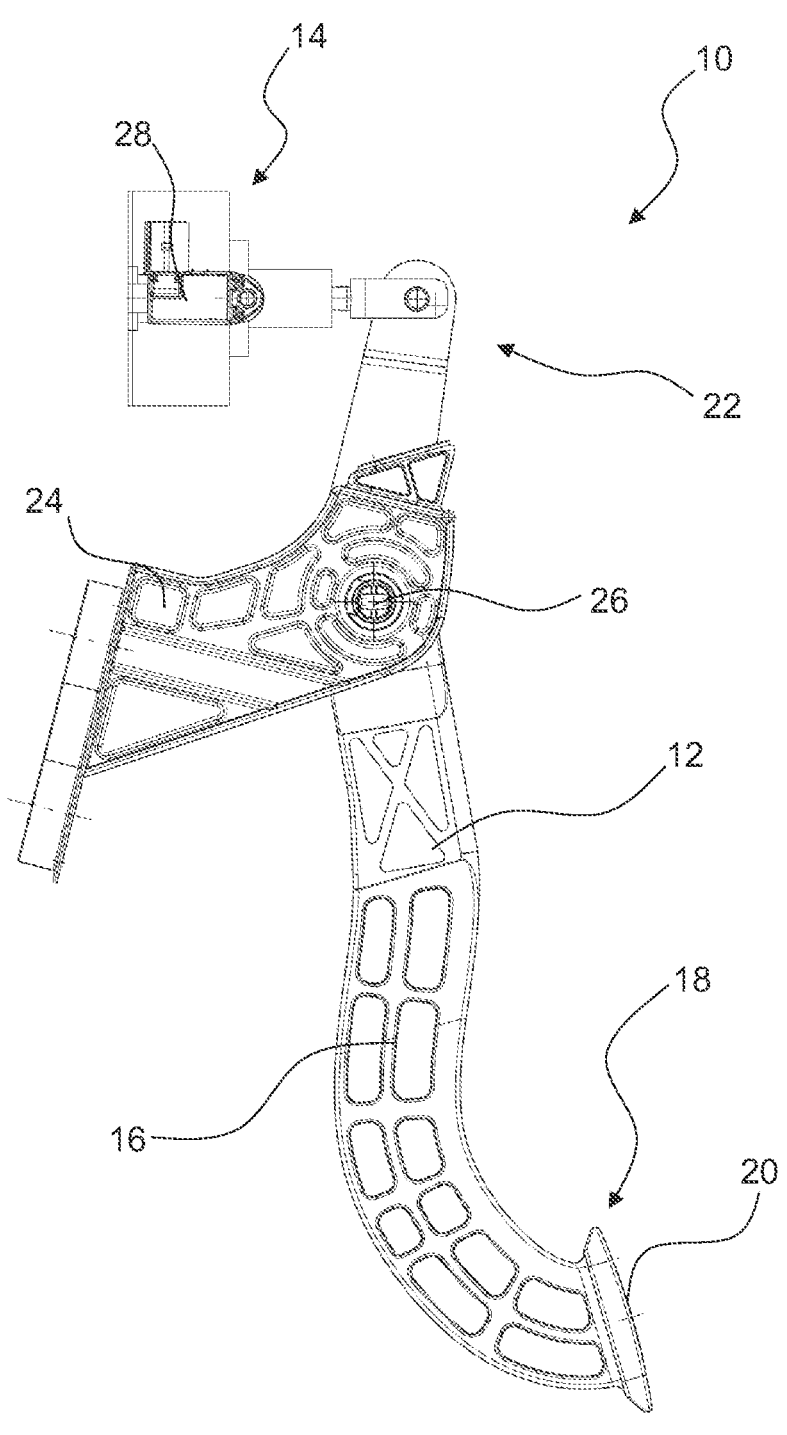
FIG. 1 shows a brake pedal module according to the disclosure in a side view.
Figure 2:
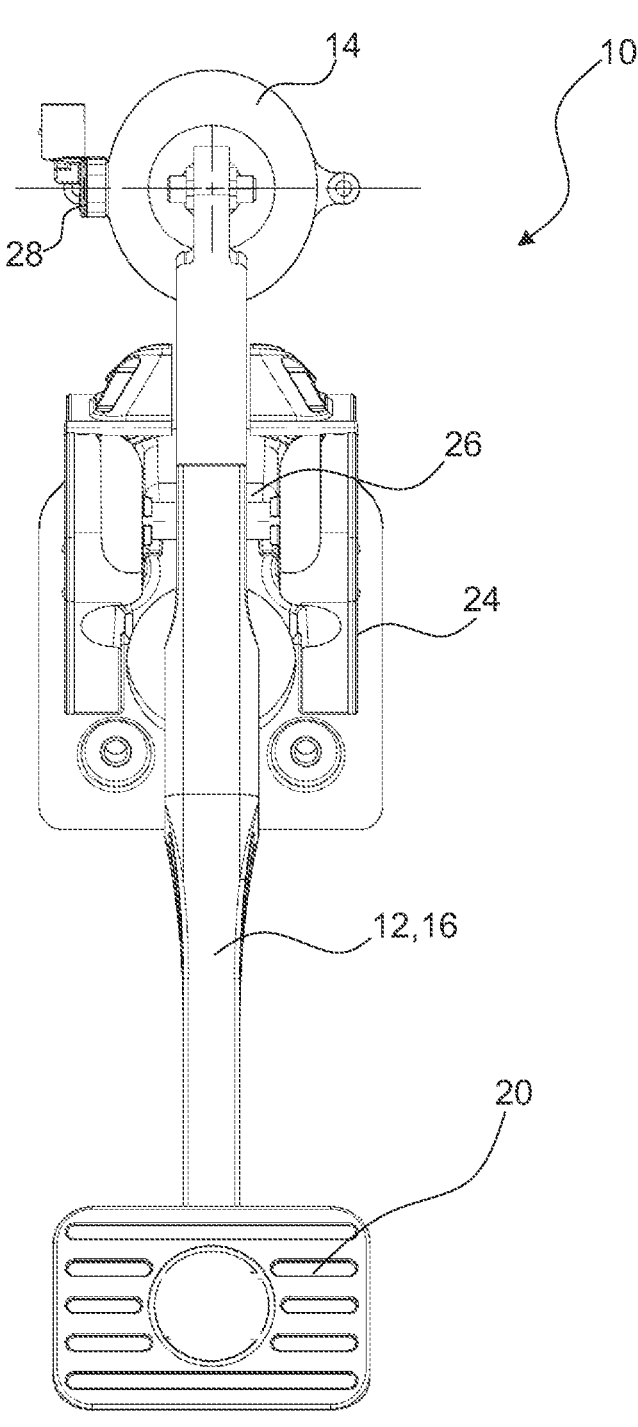
FIG. 2 shows the brake pedal module from FIG. 1 in a plan view.

FIGS. 1 and 2 show a pneumatic brake pedal module 10 for a "brake-by-wire" brake system of a vehicle in a side view and a plan view.

In particular, the brake pedal module 10 may serve to electronically detect a braking intention of a driver.

The brake pedal module 10 comprises a pivotably mounted brake pedal 12 and a damping unit 14, which is mechanically coupled to the brake pedal 12.

The damping unit 14 is used to generate a resistance when the brake pedal 12 is actuated.

The brake pedal 12 is formed by a strut 16.

At a first end 18, the strut 16 has an actuating surface 20, which can be actuated by a driver to signal a braking intention. In other words, a driver can exert a pressure on the actuating surface 20 with the foot to signal a braking intention.

The damping unit 14 is coupled to the strut 16 at an end section 22 opposite the first end.

Between the ends of the strut 16, the brake pedal 12 is pivotably mounted on a mounting 24 fixed with respect to the vehicle.

In one exemplary arrangement, the pivotable mounting is implemented by a pivot joint 26.

In the exemplary arrangement, the mounting 24 fixed with respect to the vehicle is a further strut, which can be screwed to a body part.

The strut 16 and the mounting 24 are plastic injection mouldings, for example.

The brake pedal module 10 furthermore comprises a sensor unit 28 for detecting a braking intention of a driver.

It can be seen from FIG. 1 that the damping unit 14 is subjected to tension when the brake pedal 12 is actuated. This allows particularly flexible positioning of the damping unit 14, thereby enabling the brake pedal module 10 to be integrated particularly well into an installation space environment.

For example, a distance of the damping unit 14 from the pivot joint 26 can be selected relatively freely.

Furthermore, in a further exemplary arrangement, the strut 16, which is of relatively straight design in the exemplary arrangement shown, can be angled, in particular in the pivot joint 26 or between the pivot joint 26 and the damping unit 14. As a result, the position of the damping unit 14 can also be selected in a flexible way in the longitudinal direction of the vehicle.

Compared with a damping unit which is subjected to compression, the damping unit 14 subjected to tension can thus be arranged in a particularly flexible manner in an installation space environment.

The damping unit 14 is explained in more detail with reference to FIGS. 3 and 4, which each show a section through the damping unit 14.

The damping unit 14 comprises a housing 30, in which a piston 32 is accommodated and movably mounted.

A piston rod 36 extends from an end 34 of the piston 32.

More precisely, the piston 32 has an annular surface 38 on the end 34 and a circular surface 42 on an opposite end 40.

The annular surface 38 delimits a pressure chamber 44 in the housing 30, which space is compressed by the movement of the piston 32 when the brake pedal 12 is actuated. Consequently, the piston rod 36 extends through the pressure chamber 44.

The circular surface 42 delimits a vacuum chamber 46 in the housing 30, the volume of which space is increased when the brake pedal 12 is actuated.

In the exemplary arrangement, the volume of the vacuum chamber 46 is initially zero since the circular surface 42 bears against a housing wall of the housing 30.

Via the piston rod 36, the piston 32 is coupled to the brake pedal 12, an intermediate piece 48 being arranged between the piston rod 36 and the brake pedal 12 in the exemplary arrangement.

The connection between the piston rod 36 and the intermediate piece 48 and between the intermediate piece 48 and the brake pedal 12 is in each case implemented by a pin 50, 52.

Figure 3:
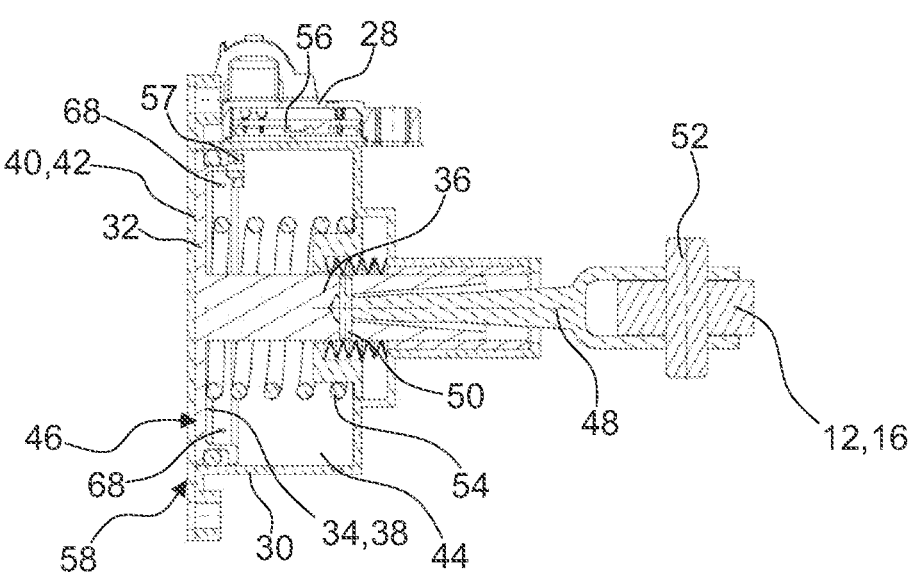
FIG. 3 shows a sectional illustration of a damping unit of the brake pedal module according to the disclosure.
Figure 4:
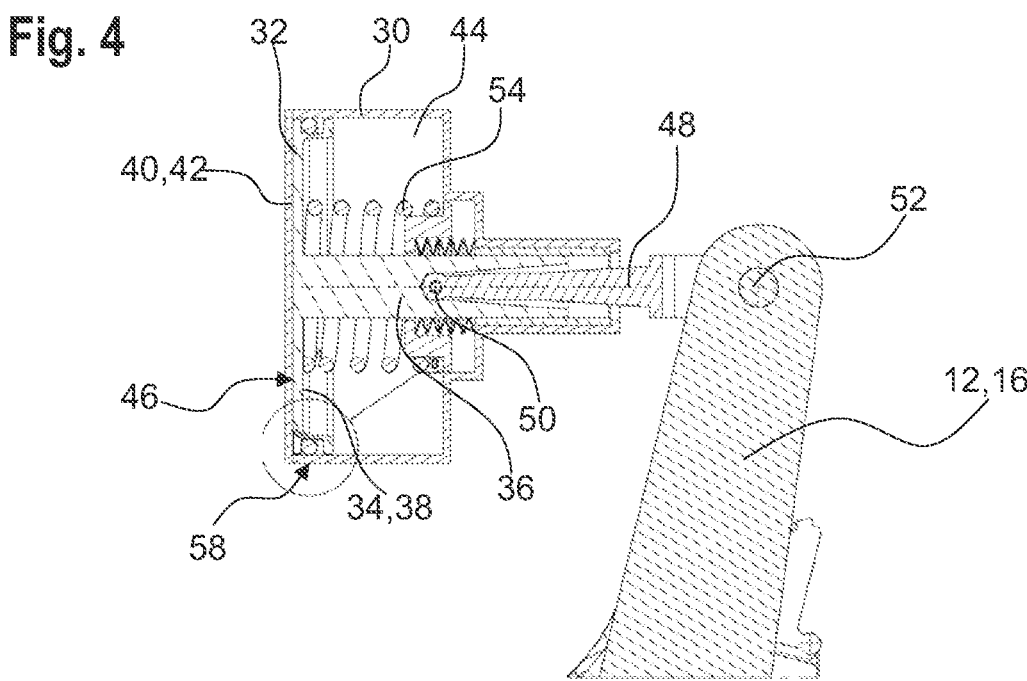
FIG. 4 shows a further sectional illustration of the damping unit of the brake pedal module according to the disclosure.

The damping unit 14 further comprises a return spring 54, which pushes the piston 32 into the unactuated initial position shown in FIG. 3. In this state, the brake pedal 12 is not actuated by a user.

FIG. 3 also shows the structure of the sensor unit 28.

In the exemplary arrangement, the sensor unit 28 comprises at least one Hall element 56, which is arranged outside the housing 30, and a magnet 57, which is secured on the piston 32.

In order to ensure that the sensor unit 28 functions reliably and a movement of the piston 32 is reliably detected, the piston 32 is mounted non-rotatably in the housing 30.

The non-rotatable mounting of the piston 32 can be achieved by a non-circular cross section of the piston 32 and a correspondingly non-circular cross section of the housing 30 (see FIG. 2).

There is a flow connection between the pressure chamber 44 and the vacuum chamber 46.

The flow connection is implemented by restrictor 58, which is integrated into the piston 32.

The restrictor 58 is designed in such a way that it restricts an air flow from the pressure chamber 44 into the vacuum chamber 46 when the brake pedal 12 is actuated more than an air flow from the vacuum chamber 46 into the pressure chamber 44 when the brake pedal 12 is reset.

Figures 5, 6:
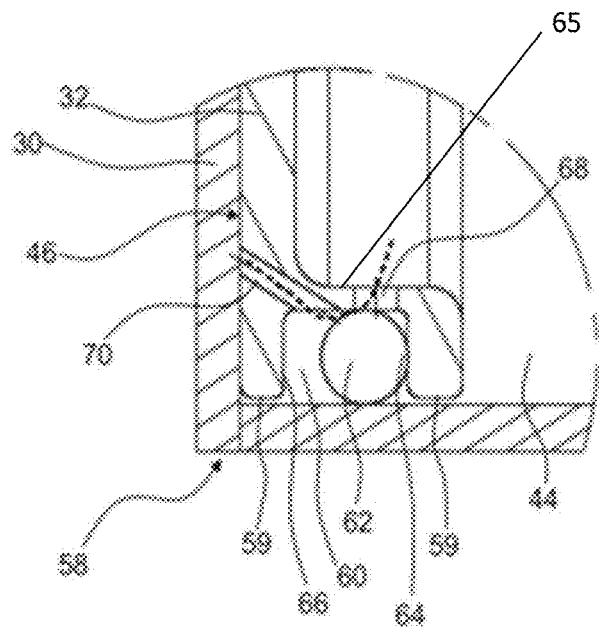
FIG. 5 shows a detail view in the region of a restrictor of the damping unit.
FIG. 6 shows the restrictor of the damping unit from FIG. 5 in a further state.

The structure and mode of operation of the restrictor 58 is explained with reference to FIGS. 5 and 6, which each show a detail view in the region of a running surface 59 of the piston 32, FIG. 5 illustrating a state when the brake pedal 12 is actuated and FIG. 6 illustrating a state when the brake pedal 12 is being reset.

On its running surface 59, the piston 32 has an encircling annular space 60, which is formed, for example, by an encircling groove.

A ring seal 62 is accommodated in an axially movable manner in the annular space 60.

The ring seal 62 is located in at least one flow path between the pressure chamber 44 and the vacuum chamber 46 and forms the restrictor 58 in the at least one flow path.

The annular space 620 is bounded by two opposite, axial boundary surfaces 64, 66. A cross web 65 connects the axial boundary surfaces 64, 66.

Starting from the annular space 60, near the boundary surface 64 which is closer to the pressure chamber 44, a plurality of first openings 68 in the piston 32 leads to the pressure chamber 44 (see also FIG. 3). For example, six first openings 68 are provided, which are distributed uniformly in the circumferential direction of the piston 32.

Furthermore, starting from the annular space 60, near the boundary surface 66 which is further away from the pressure chamber 44, a plurality of second openings 70 in the piston 32 leads to the vacuum chamber 46. For example, six second openings 70 are provided, which are distributed uniformly in the circumferential direction of the piston 32.

In the exemplary arrangement, the first openings 68 have, in total, a larger flow cross section than the second openings 70 in total. This can also be achieved if, when considered individually, the first openings 68 have a flow cross section which is smaller than or the same as that of the second openings 70, but are present in a larger number.

The restrictor 58 frees different flow cross sections in the at least one flow path depending on the axial direction of movement, and damps the movement of the piston 32 with differing degrees of strength depending on a direction of movement of the piston 32.

Specifically, depending on the direction of movement, the ring seal 62 rests selectively on one of the two opposite axial boundary surfaces 64, 66 of the annular space 60 and thereby changes a flow cross section of the at least one flow path between the pressure chamber 44 and the vacuum chamber 46.

In the event of a change in direction of the piston 32, the ring seal 62 is automatically moved in the annular space 60 to the first openings 68 or the second openings 70 and changes an effective flow cross section of the openings 68, 70.

The position of the openings 68, 70 is matched to the displaced positions of the ring seal 62 in the annular space 60 in such a way that, when the brake pedal 12 is actuated, the ring seal 62 reduces a flow path from the pressure chamber 44 to the vacuum chamber 46 and, upon return to the initial position, frees a flow path from the vacuum chamber 46 to the pressure chamber 44, in particular to the maximum extent.

For this purpose, the first openings 68 and the second openings 70 are partially covered in the associated position of the ring seal 62.

When the brake pedal 12 is actuated by a driver, the ring seal 62 comes to rest against boundary surface 66, as illustrated in FIG. 5. As a result, the ring seal 62 seals a flow path out of the annular space 60 along the running surface 59 of the piston 32 into the vacuum chamber 46, with the result that in this state no or only a small amount of fluid can flow along the running surface 59 of the piston 32 into the vacuum chamber 46.

This means that a fluid flow from the pressure chamber 44 into the vacuum chamber 46 must take place at least for the most part via the openings 68, 70.

In addition, the second openings 70 are partially covered by the ring seal 62 when the ring seal 62 is in the position illustrated in FIG. 5.

The flow path of the fluid during actuation of the brake pedal 12 is illustrated by means of a dashed line in FIG. 5.

When the brake pedal 12 is actuated, when the pressure chamber 44 is compressed and the vacuum chamber 46 is expanded, a vacuum is produced in the vacuum chamber 46 and an excess pressure is correspondingly produced in the pressure chamber 44, with the result that fluid is sucked into the vacuum chamber 46 from the pressure chamber 44.

However, since the fluid flow into the vacuum chamber 46 must take place via the relatively small second openings 70, which are additionally covered by the ring seal 62, a pressure equalization between the pressure chamber 44 and the vacuum chamber 46 takes place only relatively slowly when the piston 32 is actuated, with the result that there is strong damping of the piston movement.

When the brake pedal 12 is released, the piston 32 is moved back into its initial position by the return spring 54.

In this case, the pressure chamber 44 is correspondingly expanded and the vacuum chamber 46 compressed, with the result that fluid which was sucked into the vacuum chamber 46 when the brake pedal 12 was actuated is forced out of the vacuum chamber 46 again and flows into the pressure chamber 44.

As a result of the change in the direction of movement of the piston 32, the ring seal 62 detaches from the boundary surface 66 remote from the pressure chamber 44 and comes to rest against the opposite boundary surface 64, as illustrated in FIG. 6.

In this state, the fluid flow along the running surface of the piston 32 is no longer sealed from the annular space 60 into the vacuum chamber 46, but from the annular space 60 into the pressure chamber 44.

Moreover, it is no longer the second openings 70 but the first openings 68 which are partially covered by the ring seal 62.

In an alternative exemplary arrangement, the first openings 68 can be uncovered while the brake pedal 12 is being reset.

The fluid flow when the brake pedal 12 is released consequently runs from the vacuum chamber 46, via the now uncovered second openings 70, into the annular space 60 and, starting from the annular space 60, once again through the first openings 68 into the pressure chamber 44.

The flow path of the fluid when the brake pedal 12 is released is likewise illustrated by a dashed line in FIG. 6.

Since the first openings 68 have a larger flow cross section than the second openings 70 and, in addition, are covered to a lesser extent by the ring seal 62, the fluid flow from the vacuum chamber 46 into the pressure chamber 44 can take place more quickly when the brake pedal 12 is unactuated than when the brake pedal 12 is being actuated, as a result of which less pronounced damping of the piston movement and thus rapid resetting of the brake pedal 12 takes place.

As already mentioned above, the first openings 68 can also remain uncovered. This is achieved, for example, by extending the annular space 60 in the axial direction and locating the first openings 68 at a greater distance from boundary surface 64 than in the exemplary arrangement illustrated.

In the case of the brake pedal module 10 illustrated in FIGS. 1 to 6, the damping unit 14 is subjected to tension.

Figure 7:
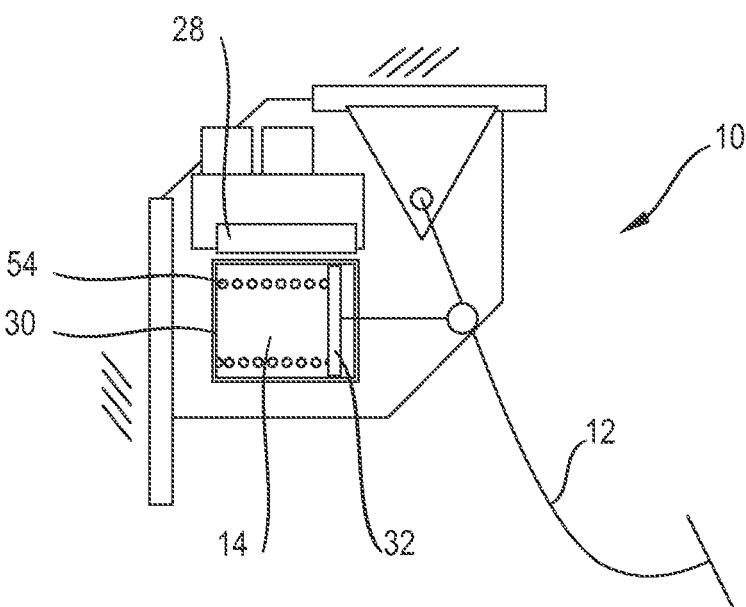
FIG. 7 shows schematically a further brake pedal module according to the disclosure.

However, it is also possible to arrange the damping unit 14 in such a way that the damping unit 14 is subjected to compression. A brake pedal module 10 of this type is illustrated schematically in FIG. 7.

Nothing changes in the mode of operation of the restrictor 58 when the damping unit 14 is subjected to compression; only the arrangement of the pressure chamber 44 and the vacuum chamber 46 are interchanged.

The invention claimed is:

1. A pneumatic brake pedal module for a brake-by wire brake system of a vehicle, comprising:

a pivotably mounted brake pedal and a damping unit, which is mechanically coupled to the brake pedal in order to generate a resistance when the brake pedal is actuated, wherein the damping unit comprises a housing and a piston movably mounted in the housing and dividing an internal space of the housing into a pressure chamber and a vacuum chamber, wherein the pressure chamber and the vacuum chamber are connected to one another in terms of flow and the piston has a piston end that defines a running surface having an encircling annular space in which a ring seal is accommodated in an axially movable manner, wherein the annular space is defined by first and second axial boundary surfaces spaced apart from one another and a cross web radially connecting the first and second axial boundary surfaces, wherein the first axial boundary surface is formed from the piston end and the second axial boundary surface is disposed on a wall member extending from the cross web radially outwardly, wherein the ring seal is located at least in a flow path between the pressure chamber and the vacuum chamber and forms a restrictor in the at least one flow path, wherein the restrictor is configured to provide asymmetric damping by selectively freeing different flow cross sections depending on the axial direction of piston movement, and wherein the ring seal, rest selectively against the first axial boundary surface or the second axial boundary surface and thereby either (i) blocks substantially all flow along the running surface into one of the chambers or (ii) frees flow along the running surface into the other chambers, and wherein a plurality of first openings through the piston leading from the annular space into the pressure chamber has a larger total flow cross-section than a plurality of second openings through the piston leading from the annular space into the vacuum chamber.

2. The brake pedal module according to claim 1, wherein the annular space and the ring seal are designed in such a way that, depending on the axial direction of movement, the ring seal rests selectively on one of the first and second axial boundary surfaces of the annular space and changes a flow cross section of the at least one flow path.

3. The brake pedal module according to claim 2, wherein, depending on which of the first and second axial boundary surface the ring seal bears against, the ring seal seals a flow path from the annular space along the running surface past the piston either into the vacuum chamber or into the pressure chamber.

4. The brake pedal module according to claim 2, wherein the ring seal is designed in such a way that, when the direction of the piston changes, the ring seal is moved automatically in the annular space to the at least one first opening or at least one second opening and changes an effective flow cross section of the openings.

5. The brake pedal module according to claim 4, wherein the at least one first and/or at least one second opening is partially covered in the associated position of the ring seal.

6. The brake pedal module according to claim 4 wherein, the position of the openings is matched to displaced positions of the ring seal in the annular space in such a way that, when the brake pedal is actuated, the ring seal reduces a flow path from the pressure chamber to the vacuum chamber and, upon return to the initial position, frees a flow path from the vacuum chamber to the pressure chamber.

7. The brake pedal module according to claim 1, wherein the damping unit comprises a return spring, which is arranged in the pressure chamber.

8. The brake pedal module according to claim 1, wherein the damping unit is pneumatically self-contained.

9. The brake pedal module according to claim 1, wherein the damping unit is mechanically coupled to the brake pedal in such a way that the damping unit is subjected to tension or compression when the brake pedal is actuated.

10. The brake pedal module according to claim 3 wherein, wherein the ring seal is designed in such a way that, when the direction of the piston changes, the ring seal is moved automatically in the annular space to the at least one first opening or at least one second opening and changes an effective flow cross section of the openings.

11. The brake pedal module according to claim 10, wherein the at least one first and/or at least one second opening is partially covered in the associated position of the ring seal.

12. The brake pedal module according to claim 11 wherein, the position of the openings is matched to displaced positions of the ring seal in the annular space in such a way that, when the brake pedal is actuated, the ring seal reduces a flow path from the pressure chamber to the vacuum chamber and, upon return to the initial position, frees a flow path from the vacuum chamber to the pressure chamber.

13. The brake pedal module according to claim 5 wherein, the position of the openings is matched to displaced positions of the ring seal in the annular space in such a way that, when the brake pedal is actuated, the ring seal reduces a flow path from the pressure chamber to the vacuum chamber and, upon return to the initial position, frees a flow path from the vacuum chamber to the pressure chamber.

14. The brake pedal module according to claim 12, wherein the at least one first opening has a larger flow cross section than the at least one second opening.

15. The brake pedal module according to claim 14, wherein the damping unit comprises a return spring, which is arranged in the pressure chamber.

16. The brake pedal module according to claim 15, wherein the damping unit is pneumatically self-contained.

17. A pneumatic brake pedal module for a brake-by wire brake system of a vehicle, comprising a pivotably mounted brake pedal and a damping unit, which is mechanically coupled to the brake pedal in order to generate a resistance when the brake pedal is actuated, wherein the damping unit comprises a housing, a piston, and a return spring, wherein the piston is mounted movably in the housing and divides an internal space of the housing into a pressure chamber and a vacuum chamber, wherein the return spring is arranged in the pressure chamber, wherein the pressure chamber and the vacuum chamber are connected to one another in terms of flow and the piston has a piston end that defines a running surface having an encircling annular space in which a ring seal is accommodated in an axially movable manner, wherein the annular space is defined by first and second axial boundary surfaces spaced apart from one another and a cross web connecting the first and second axial boundary surfaces, wherein the first axial boundary surface is formed from the piston end and the second axial boundary surface is disposed on a wall member extending from the cross web radially outwardly, wherein the ring seal is located at least in a flow path between the pressure chamber and the vacuum chamber and forms a restrictor in the at least one flow path, which restrictor freeing different flow cross sections in the at least one flow path depending on an axial direction of movement, and damps the movement of the piston with differing degrees of strength depending on a direction of movement of the piston, and wherein the piston end includes a recessed actuation surface defined by the cross web, against which an end of the return spring is disposed.

* * * * *